Jan. 5, 1926.

F. Y. PEARNE

VALVE

Filed June 26, 1924

1,568,236

Inventor
Frank Y. Pearne
by Nuttall and Wallace
his Attorneys

Patented Jan. 5, 1926.

1,568,236

UNITED STATES PATENT OFFICE.

FRANK Y. PEARNE, OF LOS ANGELES, CALIFORNIA, ASSIGNOR TO LACY MANUFACTURING COMPANY, OF LOS ANGELES, CALIFORNIA, A CORPORATION OF CALIFORNIA.

VALVE.

Application filed June 26, 1924. Serial No. 722,475.

*To all whom it may concern:*

Be it known that I, FRANK Y. PEARNE, a citizen of the United States, and resident of Los Angeles, in the county of Los Angeles and State of California, have invented new and useful Improvements in a Valve, of which the following is a specification.

This invention relates to a valve and operating mechanism therefor and the embodiment shown herein is more especially suitable for controlling the delivery of liquids from tank wagons or trucks. In apparatus of this character, it is desirable to be able to control and operate the valves at a place remote from the valves so that in the event of danger, damage or failure of the outlet outside the tank, the valves may be immediately closed. This type of valve is commonly known as an emergency valve. The primary object of this invention is to provide a valve which will not leak, is simple, durable, positive and quick in operation. Heretofore, valves of this character have been located at the bottom of the tank and operated by mechanism extending upwardly through the tank chamber to the top of the tank. Another object of this invention is to provide a valve which can be inserted in the bottom of the tank and positively operated by a mechanism outside of and below the tank.

Figure 1:
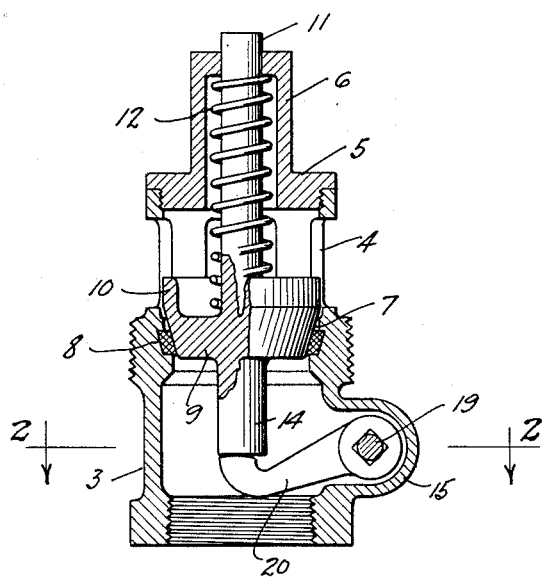
Figure 2:
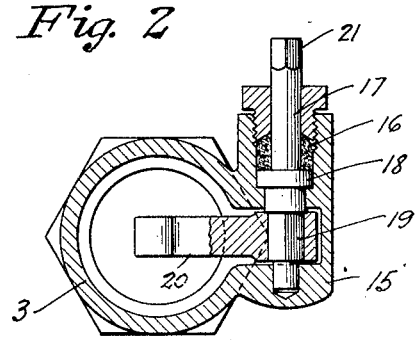

These objects together with other objects and corresponding accomplishments are obtained by means of the embodiment of my invention illustrated in the accompanying drawing, in which:

Fig. 1 is a vertical section through a complete valve unit; Fig. 2 is a section as seen on the line 2—2 of Fig. 1.

Referring more particularly to the drawing, 3 indicates a valve body having an upper externally threaded portion to screw into the tank. The lower portion is internally threaded to receive the outlet or delivery pipe. The upper portion of the body is formed with a valve cage consisting of a cylindrical portion 4 with lateral openings. The upper end thereof is internally threaded to receive a cap 5 provided with a crown 6 to house a compression spring for the valve. The cap has an opening through which the valve stem may extend. In the wall 7 of the opening in the valve body which connects the interior of the body with the cage is a leather ring 8 having a bevelled seat.

A valve having a tapered portion 9 and a cylindrical portion 10 is mounted in the valve cage. The tapered portion corresponds to the bevel of the seat and the cylindrical portion slidingly fits within the bore of the cage so as to assist in guiding the valve in its reciprocable movement. As a further guide for the valve, a stem 11 extends through the opening in the crown 6. Coiled about the stem 11 and disposed between the crown and the valve is a compression spring 12 which tends to hold the valve upon its seat. Depending from the valve is an operating stem 14 which extends into the body 3.

The body 3 is provided at one side with an extension 15 having a chamber communicating with the main bore of the body. One end of the extension is open and is internally threaded to receive the packing and gland of a stuffing box indicated generally by 16. A pintle 17 is rotatably mounted in the extension, it having a collar 18 to prevent endwise displacement and a squared portion 19 for mounting an arm 20 thereon. The arm has an upturned end adapted to be disposed beneath the operating stem 14, whereby upon turning the pintle 17 to raise the arm 20, the valve may be raised off its seat against the action of spring 12. The external end of pintle 17 is squared as indicated by 21 to provide for connection to suitable operating mechanism. The valve is positively opened by upward movement of arm 20. Spring 12 tends to maintain the valve closed at all times.

Valves of the character just described are much used in gasoline tank structures. It has been found difficult to prevent the leakage of gasoline between the seat and gate of valves of this character. Applicant has overcome this difficulty by the use of a leather seat, and this is an important feature of the present construction.

What I claim is:

1. In a valve, the combination of a valve body adapted to be attached in the opening of a tank, a cage on the top of said body arranged to be disposed in the tank chamber, said cage having a cylindrical bore, said valve body having an opening connecting its interior with said cage, a leather ring inserted in a recess in the wall surrounding said opening and having a bevelled seat, a valve having a tapered portion for engagement with said seat and a cylindrical portion arranged to be slidingly guided in said cage, an upstanding stem on said valve guided in a bearing at the top of said cage, a compression spring about said upstanding stem tending to maintain said valve on its seat, an operating stem depending from said valve, a pintle mounted in said body and extending outside thereof for connection to valve operating mechanism, and an arm within said body secured to said pintle so as to be engaged with said operating stem for lifting said valve.

2. In a valve, the combination of a valve body adapted to be attached in the opening of a tank, a cage on the top of said body arranged to be disposed in the tank chamber, said cage having a cylindrical bore, said valve body having an opening connecting the interior with said cage, a leather ring disposed in a recess in the wall surrounding said opening and having a bevelled seat, a valve having a tapered portion for engagement with said seat and a cylindrical portion arranged to be slidably guided in said cage, an operating stem depending from said valve and a guide stem upstanding therefrom, a pintle mounted in said body and extending outside thereof for connection to valve operating mechanism, an arm within said body secured to said pintle so as to be engaged with said operating stem for lifting said valve, a cap detachably secured in the top of said cage having a crown to receive said guide stem and a closure spring in said crown engaging said valve.

In witness that I claim the foregoing I have hereunto subscribed my name this 17th day of June, 1924.

FRANK Y. PEARNE.